United States Patent Office 3,733,393
Patented May 15, 1973

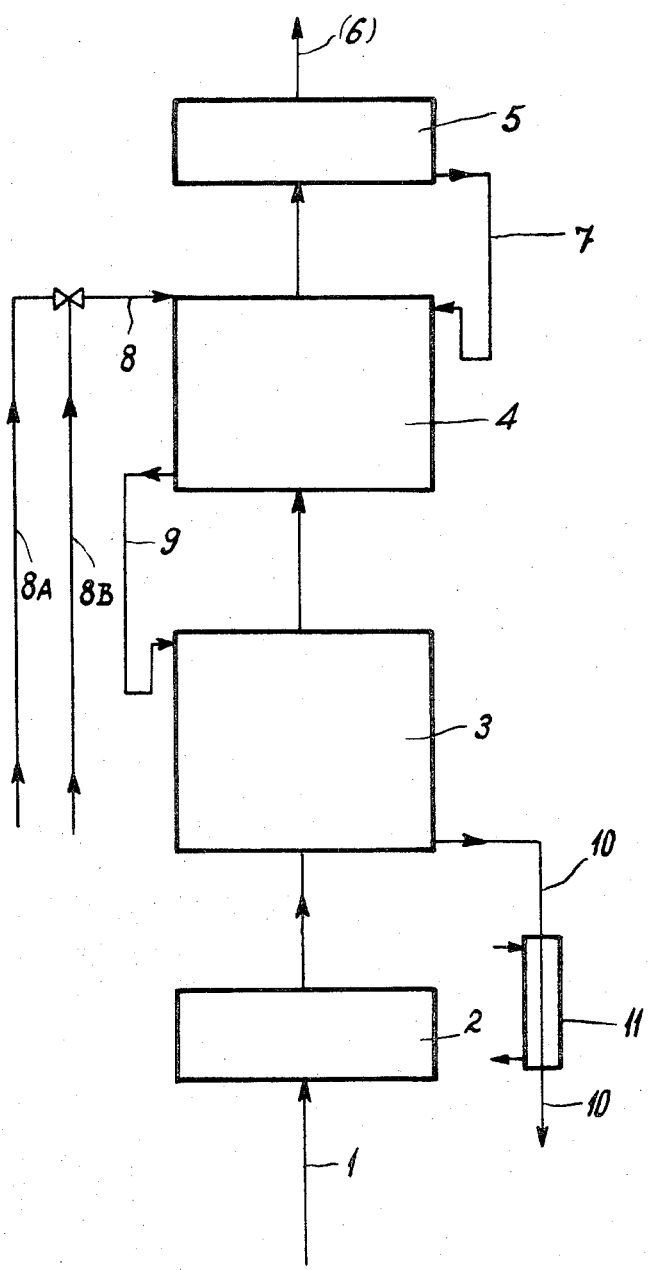

3,733,393
PURIFICATION OF COMBUSTION PRODUCTS BEFORE DISCHARGE INTO THE ATMOSPHERE
Jean-Pierre Couillaud, Antony, and Jean Louise, Villejuif, France, assignors to l'Air Liquide, Societe Anonyme Pour l'Etude et l'Exploitation des Procedes Georges Claude, Paris, France
Filed Sept. 30, 1971, Ser. No. 185,113
Claims priority, application France, Sept. 30, 1970, 7035347; Aug. 17, 1971, 7129931
Int. Cl. B01d 47/00
U.S. Cl. 423—215                                5 Claims

ABSTRACT OF THE DISCLOSURE

The invention relates to a process for purifying combustion fumes and other residual gases before being discharged into the atmosphere. The process comprises at least two stages, consisting in a first dust-extraction phase and then a second chemical purification phase of the fumes, in which is achieved an intimate contact of the said smokes with a solution containing hydrogen peroxide.

---

The present invention relates to a process for purifying fumes which contain particularly sulphur oxides and possibly nitrogen oxides as impurities. It is also concerned with any installation permitting this purification process to be carried into effect.

More specifically, the present invention concerns a process for purifying fumes which are produced by thermal units with cold or hot walls, containing sulphur oxides resulting from the oxidation of the sulphur contained in the fuels providing the combustion and possibly also containing oxides resulting from the combustion proper. It is in fact known that the harmful poluting properties of sulphur oxides and certain nitrogen oxides are such that it is necessary to prevent these gases being freely discharged into the atmosphere. Furthermore, it is of economic interest to recover these gases in the form of acids or salts of these acids and particularly in the form of sulphuric acid, fuming sulphuric acid, sulphonitric acid, etc.

Numerous processes for purifying smokes are known. Hence, it is in particular possible for the smoke from steam generating stations containing sulphur dioxide to be treated either by ozonised oxygen, or by dry catalysis with vanadium salts, or even by injection of ammonia which leads after several intermediate stages to ammonium sulphate. The disadvantage of the known processes for treating smokes with ozone is that it does not permit a perfect purification of the smokes. The other hitherto known processes only function with efficiencies which are of little interest or even lead only to formed products which subsequently cannot be used to any great extent in industry or have the disadvantage of a cost which is incompatible with economic requirements.

According to the present invention, a process for purifying combustion smokes and other sulphurous residual gases has been found, with which it is possible to obtain a practically complete elimination of sulphuric dioxide and sulphur trioxide and an interesting elimination of the nitrogen oxides which are possibly present, and smokes which are absolutely clean and cold after having been purified, with a lower cost and the recovery of a quality by-product.

The present invention is concerned with a process for purifying smokes, fumes and gases which contain particularly sulphur dioxide and possibly nitrogen oxides and vapours of sulphuric acid as impurities, the process comprising at least two stages consisting in a first dust-extraction phase and then a second chemical purification or scrubbing phase of the smokes, in which is achieved an intimate contact of the said smokes with a solution containing hydrogen peroxide.

According to one embodiment of the present invention, a part of the sulphuric acid formed during the chemical purification phase, free from hydrogen peroxide, is recycled to the supply for the first dust-extraction stage.

Whatever the embodiment being employed, it is an aqueous solution of hydrogen peroxide which is used as initial material. This solution, of greater or lesser concentration, is introduced as such into the chemical purification phase for the smokes.

According to one embodiment of the present invention, a part of the sulphuric acid formed during the chemical scrubbing phase is recycled to this said phase with previous reinjection of hydrogen peroxide.

For obtaining a quantitative yield, calculated on the hydrogen peroxide, the sulphuric acid which is formed must be completely freed from this reagent. The countercurrent circulation of the liquid fluids and the smokes permits the highest yields to be obtained.

According to one embodiment of the present invention, the mechanical cleansing or dust-extraction is effected in at least two identical sequences, and it is possibly followed by the chemical purification phase, which is itself carried out in at least two identical sequences.

In the case of a series of mechanical cleansing sequences and a series of chemical purification sequences, the liquid supply of each chemical sequence is assured by cascade recycling from the following sequence, that is to say, downstream in relation to the direction of the circulation of the gases.

In the case where cascade purification is effected, it is likewise possible to envisage a general recycling; the sulphuric acid at high concentration, formed during the chemical purification, freed from hydrogen peroxide, after cooling, and withdrawal of a part as by-product, is recycled to the top of the final chemical purification sequence. The general recycling as described can be associated with a cascade recycling which is specific for each sequence.

According to one embodiment of the invention, with the object of obtaining dry gases before discharge into the atmosphere, a maximum purification efficiency as regards impurities and a maximum yield of by-product, the chemical scrubbing is followed by a liquid-gas separation by bubbling off.

The hydrogen peroxide leads to a chemical purification with oxidation of the sulphur dioxide and the nitrogen oxides into sulphuric acid and nitric acid, respectively. The use of a series of purification columns necessitated by carrying out the process leads to a supplementary cleansing of mechanical nature of the possible sulphuric acid vapours.

The conduction of the process according to the invention is particularly advantageous, because it results in a sulphuric acid of high concentration being obtained. Furthermore, it was established that the high concentration of the acid being recirculated and of about 80% is very favourable to the stopping of nitrogen oxides.

In order to maintain the full interest of the process, it is essential that a sulphuric or sulphonitric acid as concentrated as possible is supplied. The acid can contain 0.5 to 30 g./l. of nitric acid. If the smokes or the gas to be treated contain steam, the treatment is carried out at high temperature, for example from 80 to 150° C. This restriction is however only theoretical, because if the majority of the residual industrial smokes and gases polluted with sulphur dioxide are charged to a greater or lesser degree with steam, they are also hot. Their high temperature permits them to be discharged at a considerable height by means of high chimneys. The conduction of the process does not involve a cooling of the treated gas and thus permits its normal discharge by means of existing chimneys; however, it would be possible considerably to reduce the dimensions of the latter, because of the high degree of cleansing of the smokes.

The present invention is also concerned with any installation for carrying the aforesaid process into effect.

According to one embodiment of the installation, it is possible to employ a single purifier absorber-type scrubber, in which the intimate contact between gas and liquid causes the simultaneous absorption of the sulphur dioxide and partially of the nitrogen oxides. However, most of the smokes contain dust and soots. These polluting substances contain decomposition catalysts of the hydrogen peroxide (Fe, Mn, V, Mo, Pb, etc.) The consumption of hyrogen peroxide, which is stoichiometric on clean gas, is no longer so in the simultaneous presence of dust and hydrogen peroxide. This consumption increases with the concentrations of hydrogen peroxide, dusts or soots and with the temperature. As a consequence, when a dust-laden gas is treated and when it is desired to use a single absorber, it is necessary to have in the latter two different phases, depending on the direction of flow of the fumes, these being a first dust-extraction phase, preferably supplied with the sulphuric acid manufactured in the following phase and containing the least possible amount of hydrogen peroxide and a second oxidation phase effected in the absence of dust.

According to a second embodiment of the present invention, it is possible to use two or more purifier scrubbers installed in series on the smoke circuits. If the gas is polluted with the dust, the first scrubber or scrubbers will be used for the dust extraction; the following purifier scrubber or scrubbers are used for the chemical cleansing with hydrogen peroxide. Furthermore, the extraction of dust can be effected in a manner completely independent of the oxidation phase.

Nevertheless, although the dust extractors known as "dry" dust extractors (conventional or electrostatic filtration, etc.) can be used without restriction, the dust extractors known as "wet" dust extractors have the disadvantage of cooling and moistening the smokes and this necessarily involves a high dilution of the sulphuric acid supplied by the process of the present invention. In order to obviate this disadvantage, it is possible to replace the dust extracting water by a liquid of low vapour tension having good wetting power for dust and soot. Sulphuric acid is especially suitable in this case; the dust-laden acid is filtered and recycled to the dust extractor. It is also possible to convey some of the sulphuric acid produced by the chemical scrubber or scrubbers of the present invention towards the dust extractor. The acid which is produced thus leaves the dust extraction stage charged with solid impurities contained in the smokes, as in the case described above where a single scrubber is used.

On the other hand, it is quite evident, if it is desired to obtain a quantitative yield of hydrogen peroxide, that the acid provided by the process must be completely exhausted of this reagent. Without restricting the scope of the present invention, as previously mentioned, the most satisfactory procedure for avoiding the restraint is to produce a liquid flow through the scrubber or scrubbers in counter-current with the gas flow.

Thus, for example, in a purifier-scrubber of the column type, the smokes circulating from top to bottom, the liquid (aqueous or hydrosulphuric solution of hydrogen peroxide) introduced at the top of the absorber or of the series of absorbers is impoverished in its peroxide content as it descends in the absorber, while it encounters a gas with an increasingly higher content of sulphur dioxide. If a series of chemical absorbers is used, the liquid supply of each is assured by the absorber next downstream of the gaseous circuit. It is quite possible to envisage a recycling of liquid specific for each scrubber; however, it would also be possible to provide a general recycling: the acid freed from its hydrogen peroxide supplied by the upstream scrubber will be recycled downstream onto the top absorber, after drawing off the quantity which is produced.

In most cases, the fumes to be treated simultaneously contain dusts, soots, nitrogen oxides and are very hot, being at 120 to 150° C. and sometimes higher; the oxidation of the sulphur dioxide by the hydrogen peroxide is very exothermic and theoretically the pressure of 1000 v.p.m. of $SO_2$ raises the temperature by about 70 F.

Now the discharge of these completely purified smokes no longer necessitates a very high chimney and therefore not a high temperature; it is then possible to limit the temperature of the downstream absorber to less than 100° C., for example, by dilution of the injected hydrogen peroxide with water; this permits the possible risks of decomposition as described above to be reduced.

On the other hand, in all cases, whatever the gas to be treated, it is advantageous not to cool the upstream absorber, so as to obtain on the one hand the sulphuric acid of highest possible concentration and on the other hand a better adsorption of the nitrogen oxides. This absorption is in fact all the more rapid as the acid is more concentrated.

In the following examples, given without any limiting character, it is noted that as regards the gases suitably freed from their dusts and nitrogen oxides, the yield calculated on the hydrogen peroxide is quantitative, even at 100 to 140° C.

EXAMPLE 1

Into a laboratory absorber comprising a 500 ml. spherical flask, heated to 100–102° C. and containing 80 ml. of 70% sulphuric acid and 10 g./l. of $H_2O_2$, are introduced 200 litres (at n.t.p.) per hour of a gas composed of 89.% of nitrogen, 11% of steam and 900 v.p.m. of $SO_2$. The gas bubbles into the acid by way of a bent immersion tube with an internal diameter of 6 and formed with a hole of diameter 5 directed upwardly. The bubbling height is 2 cm. The gas then passes into an $SO_2$ analyzer. The steam tension of the injected gas and of the acid are the same (about 85 mm. Hg), that is to say, there is no transfer of water between the two fluids and the concentration of the acid is kept in the region of 70%.

A total absorption of the $SO_2$ is observed, while the $H_2O_2$ concentration remains higher than 4.5 g./l.; this absorption then becomes increasingly more partial until it becomes zero, simultaneously with the disappearance of the $H_2O_2$. After testing the balance between absorbed $SO_2$ and consuled $H_2O_2$ is effected. It is seen that the $H_2O_2$ yield is practically 100%.

EXAMPLE 2

The apparatus shown in the accompanying drawing is used and it is proposed to treat the fumes from a steam boiler. The composition of the fumes, after condensation of the steam, is as follows:

| | | |
|---|---|---|
| $N_2$ | Percent v./vol | 81.7 |
| $O_2$ | do | 1.7 |
| $CO_2$—CO | do | 14 |
| $SO_3$ | | Traces |
| $SO_2$ | v.p.m | 1,250 |
| NOx | | Traces |
| Residual water | Percent | 2.3 |

After condensation, the steam tension is 87 mm. Hg (dew point 48.5° C.). In addition, they contain 220 mg./m.³ of smoky charcoal and dust. They are available at the inlet to the discharge chimney at 140–150° C.

In the installation shown in the figure, the smokes carried by the pipe 1 are first of all treated in a dust extractor 2, and then they are admitted in succession from the bottom into a first chemical purifier scrubber 3 and then into a second purifier-scrubber 4. After passing into a bubble-removing device, they are finally rejected into the atmosphere. This last apparatus is designed to retain the droplets of water created by the intimate mixing of gas and liquid in the absorbers. The liquid obtained at the bubble extractor is sent by way of the pipe 7 to the scrubber 4; it has approximately the same composition as that contained in this scrubber.

The amount of smokes which are treated is 150 m.³ (at n.t.p.) per hour.

The purifier-scrubber 4 effects the extraction of $SO_2$ from the smokes; introduced at the top through the conduit 8 is an aqueous solution of $H_2O_2$ of 41% (by weight) by way of 8A and water by way of 8B. The rate of flow of this solution is regulated so as to maintain less than 10 v.p.m. of $SO_2$ in the fumes discharged into the open air. The acid which is generated at this point flows from the base of this absorber through the conduit 9 and is reinjected at the top of the absorber 3 intended for exhausting the $H_2O_2$ contained in this acid.

At the bottom of the absorber 3, there is collected through the pipe 10 the sulphuric acid manufactured after cooling in the heat exchanger 11. The temperatures of the liquid and gaseous flows are given in the following table. The concentrations of the sulphuric acids are in accordance with the steam equilibria at the temperatures in question; water is added to the $H_2O_2$ supply for slightly cooling the purifier scrubber 2; its rate of flow (2.3 to 2 l./h.) is regulated for maintaining the discharge of the smokes from this scrubber in the region of 105° C.

After the installation has been running for 3 hours, this latter is kept operating steadily for 28 hours. All the running characteristics (average of 28 hours) are indicated in the following table. The installation is then stopped and the weight balance of this operation is effected.

EXAMPLE 3

The installation used in Example 2 is used, but the dust extraction system was improved beforehand.

The test conditions are practically the same as those achieved in Example 2, but in particular, there are obtained: an $H_2O_2$ yield of 98.5%; a 79.6% sulphuric acid containing 3.3 g./l. of nitric acid and 0.08 g./l. of charcoals which can be filtered; the filtered acid is decidedly less coloured than that of Example 2.

What we claim is:

1. A process for removing sulphur dioxide, nitrogen oxide and sulphuric acid vapor impurities from industrial fumes comprising the steps of:
    extracting dust from the fumes to yield dust-free fumes;
    chemically purifying said dust-free fumes by contacting said fumes with an aqueous solution containing $H_2SO_4$-free $H_2O_2$ whereby the sulphur dioxide contained therein is converted to $H_2SO_4$ and the nitrogen oxides are converted to nitric acid, wherein said chemically purifying step is carried out in at least two identical sequences and wherein the liquid supply of each chemical purifying sequence is achieved by flowing off from the next fume-downstream sequence except for the sequence furtherest fume-downstream; and
    separating liquid from said purified fumes by bubbling off.

2. A process in accordance with claim 1 in which the fumes and the liquid fluids circulate in counter-current.

3. A process in accordance with claim 1, in which the chemical purifying step is carried out at temperatures which are between 80 and 150° C.

|  | Smokes | | | Liquids | | |
| --- | --- | --- | --- | --- | --- | --- |
|  | T, °C. | Relative pressures mm. water column | Amount of $SO_2$, V.p.m. | T, °C. | Concentration $H_2SO_4$, percent | Concentration $H_2O_2$, g./l. |
| Outlet of bubble extractor | 102 | 0-2 | <10 |  | ca. 71 | 10 |
| Liquid supply |  |  |  | 18 | 0 | ca. 150 |
| Outlet 2d scrubber | 104 | 23 | <10 | 129 | 78.5 | 8.1 |
| Outlet 1st scrubber | 130 | 66 | 1,215 | 133 | 79.9 | 0.05 |
| Outlet of dust extractor | 135 | 110 | 1,250 |  |  |  |

The rate of flow of 41% $H_2O_2$ is kept between 650 and 700 ml./h. and on average at 673 ml./h.

The balance of these 28 hours of operation is as follows:

consumption $H_2O_2$: 18,870 litres at 41%; i.e. 8,960 g. at 100% or 263.5 moles.

sulphuric acid obtained: 29,400 g. of 79.9%, i.e. 23,500 g. of 100% or 239.7 moles yield based on $H_2O_2$: $\frac{239.7 \times 100}{263.5} = 91\%$ the sulphuric acid obtained corresponds well to the adsorbed $SO_2$.

quality of the sulphuric acid obtained: this acid contains 3.9 g./l. of pure nitric acid.

It contains some smoky charcoal: 1.05 g./l., perfectly retained on a sintered glass filter with 50 to 90 microns of porosity. The filtered acid has a faint amber colour. Moreover, these charcoals represent the main cause of an appreciable $H_2O_2$ decomposition and of the partial yield obtained, as the test described in Example 3 tends to demonstrate.

4. A process in accordance with claim 1 wherein said dust-extracting step comprises contacting the fumes with $H_2SO_4$ and further including the step of:
    cycling a portion of said $H_2SO_4$ formed by said purifying step for use as the $H_2SO_4$ in said dust-extracting step.

5. A process in accordance with claim 4, in which the concentration of said sulphuric acid is about 80%.

References Cited

UNITED STATES PATENTS 3,473,297    10/1969    Tamura et al. _____ 55—73

FOREIGN PATENTS 1,234,912    2/1967    Germany.

CHARLES N. HART, Primary Examiner

U.S. Cl. X.R.

423—393, 522, 242, 235